US012431285B2

(12) United States Patent
Nishikori

(10) Patent No.: US 12,431,285 B2
(45) Date of Patent: Sep. 30, 2025

(54) MULTILAYER CERAMIC ELECTRONIC COMPONENT

(71) Applicant: Murata Manufacturing Co., Ltd., Nagaokakyo (JP)

(72) Inventor: Makoto Nishikori, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 374 days.

(21) Appl. No.: 18/109,899

(22) Filed: Feb. 15, 2023

(65) Prior Publication Data

US 2023/0335336 A1 Oct. 19, 2023

(30) Foreign Application Priority Data

Apr. 14, 2022 (JP) ................................ 2022-066811

(51) Int. Cl.
*H01G 4/008* (2006.01)
*H01G 4/12* (2006.01)
(Continued)

(52) U.S. Cl.
CPC .......... *H01G 4/008* (2013.01); *H01G 4/1209* (2013.01); *H01G 4/232* (2013.01); *H01G 4/248* (2013.01); *H01G 4/30* (2013.01)

(58) Field of Classification Search
CPC ...... H01G 4/008; H01G 4/1209; H01G 4/232; H01G 4/248; H01G 4/30; H01G 4/0085;
(Continued)

(56) References Cited

U.S. PATENT DOCUMENTS

2013/0201600 A1* 8/2013 Nishisaka ............. H01G 4/005
361/301.4
2014/0002949 A1* 1/2014 Gu ........................ H01G 4/12
361/301.4
(Continued)

FOREIGN PATENT DOCUMENTS

JP 2003-243249 A 8/2003
JP 2006-186316 A 7/2006
(Continued)

*Primary Examiner* — Timothy J. Dole
*Assistant Examiner* — Daniel M Dubuisson
(74) *Attorney, Agent, or Firm* — Keating & Bennett, LLP

(57) ABSTRACT

A multilayer ceramic electronic component includes a multilayer body including ceramic layers and internal conductive layers and a pair of external electrodes on both ends of the multilayer body in a length direction. The internal conductive layers include first internal conductive layers and second internal conductive layers. The pair of external electrodes include a first external electrode including a first base electrode layer connected to the first internal conductive layer, and a second external electrode including a second base electrode layer connected to the second internal conductive layer. The first and second base electrode layers each include a metal portion and non-metal portions in the metal portion. In a cross-sectional view perpendicular or substantially perpendicular to a width direction, an average area of non-metal portions in a first population of non-metal portions each with a circularity about 0.4 or less is about 12 μm² or less.

19 Claims, 10 Drawing Sheets

(51) Int. Cl.
*H01G 4/232* (2006.01)
*H01G 4/248* (2006.01)
*H01G 4/30* (2006.01)

(58) Field of Classification Search
CPC ........ H01G 4/12; H01G 4/2325; H01G 4/012; H01G 4/1227
See application file for complete search history.

(56) References Cited

U.S. PATENT DOCUMENTS

2014/0002950 A1* 1/2014 Gu .................. H01G 4/005 29/25.42
2017/0018359 A1    1/2017 Kimura et al.
2019/0139704 A1    5/2019 Arai et al.
2022/0285095 A1*   9/2022 Iguchi ................ H01G 4/2325

FOREIGN PATENT DOCUMENTS

| JP | 2009-049361 A | 3/2009 |
| JP | 2017-027987 A | 2/2017 |
| JP | 2018-063997 A | 4/2018 |
| JP | 2019-087627 A | 6/2019 |

* cited by examiner

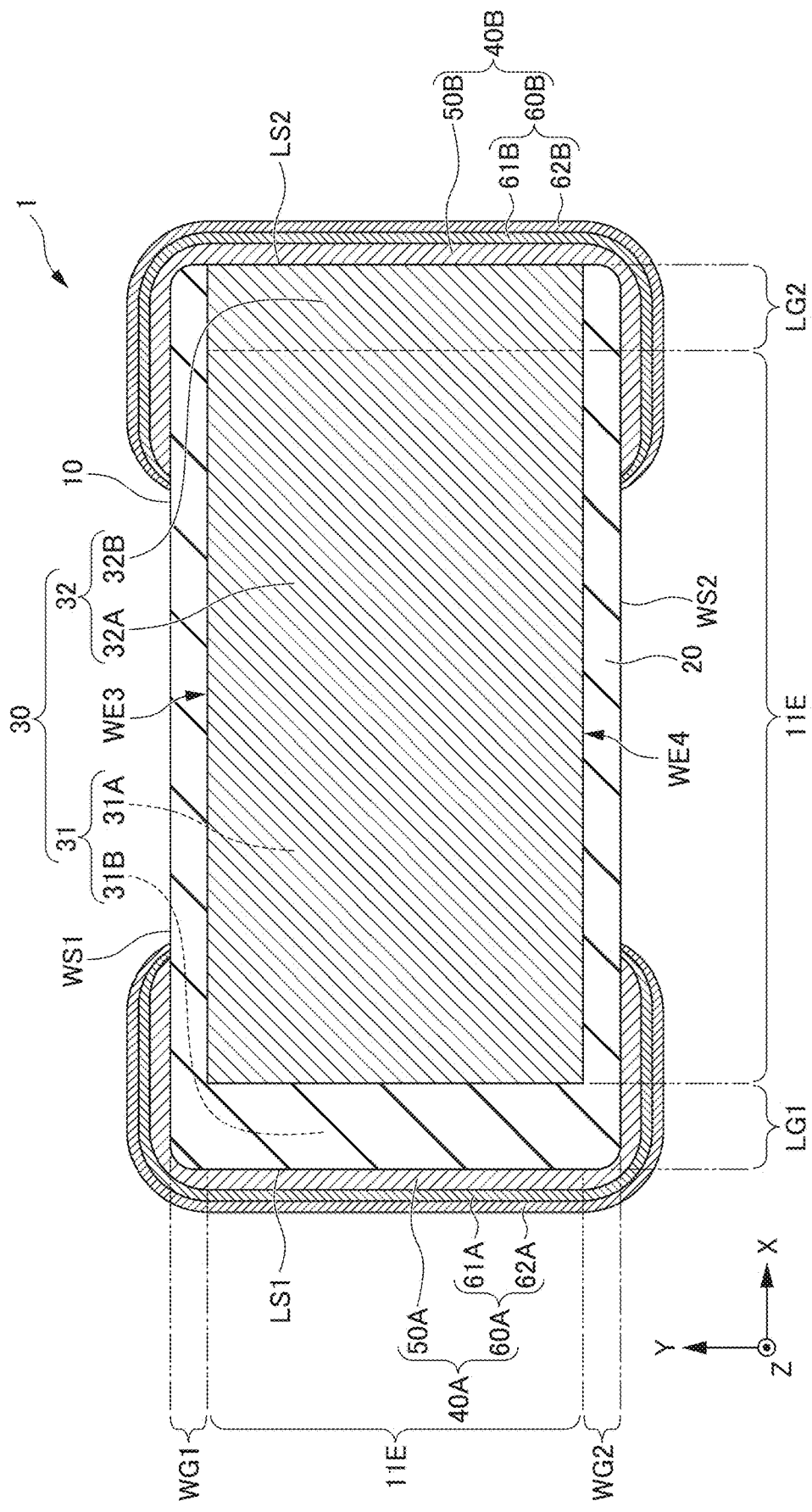

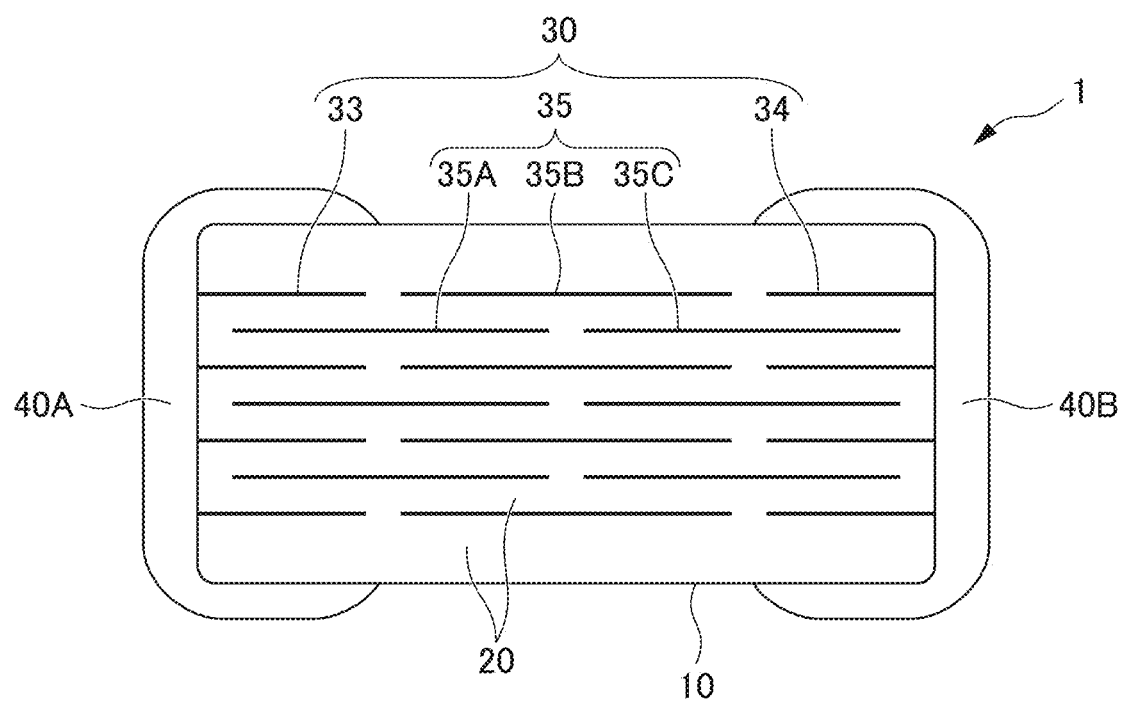

MULTILAYER CERAMIC ELECTRONIC COMPONENT

CROSS REFERENCE TO RELATED APPLICATIONS

This application claims the benefit of priority to Japanese Patent Application No. 2022-066811 filed on Apr. 14, 2022. The entire contents of this application are hereby incorporated herein by reference.

BACKGROUND OF THE INVENTION

1. Field of the Invention

The present invention relates to a multilayer ceramic electronic component.

2. Description of the Related Art

Conventionally, multilayer ceramic capacitors have been known as multilayer ceramic electronic components. Generally, the multilayer ceramic capacitors each include a multilayer body including dielectric layers and internal electrode layers which are alternately laminated therein, and external electrodes provided on both end surfaces of the multilayer body. For example, Japanese Unexamined Patent Application Publication No. 2003-243249 discloses a multilayer ceramic capacitor including the above-described structure, and also including external electrodes, each including a base electrode layer provided by firing.

SUMMARY OF THE INVENTION

Here, the base electrode layer of the external electrode has a role of preventing moisture from entering the end surface of the multilayer body from the outside in addition to a role of electrically connecting the base electrode layer to the internal electrode layers. However, the base electrode layer often includes a non-metal portion such as a void, and in such a case, the non-metal portion becomes a moisture intrusion path, which may lower moisture resistance reliability.

Preferred embodiments of the present invention provide multilayer ceramic electronic components, each having high moisture resistance reliability.

A multilayer ceramic electronic component according to a preferred embodiment of the present invention includes a multilayer body including a plurality of ceramic layers and a plurality of internal conductive layers which are alternately laminated therein in a lamination direction, a first main surface and a second main surface which are opposed to each other in the lamination direction, a first end surface and a second end surface which are opposed to each other in a length direction perpendicular or substantially perpendicular to the lamination direction, and a first lateral surface and a second lateral surface which are opposed to each other in a width direction perpendicular or substantially perpendicular to the lamination direction and the length direction, and a pair of external electrodes provided on both ends of the multilayer body in the length direction and spaced apart from each other, in which the plurality of internal conductive layers include first internal conductive layers each extending toward and exposed at the first end surface, and second internal conductive layers each extending toward and exposed at the second end surface, in which the pair of external electrodes include a first external electrode including a first base electrode layer connected to the first internal conductive layer, and a second external electrode including a second base electrode layer connected to the second internal conductive layer, in which the first base electrode layer and the second base electrode layer each include a metal portion and a plurality of non-metal portions in the metal portion, and in which, in a cross sectional view perpendicular or substantially perpendicular to the width direction, an average area of a plurality of non-metal portions in a first population of a plurality of non-metal portions each having a circularity of about 0.4 or less is about 12 μm² or less.

According to preferred embodiments of the present invention, it is possible to provide multilayer ceramic electronic components, each having high moisture resistance reliability.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4B is a cross-sectional view taken along the line IVB-IVB of FIG. 2.

FIG. 7C is a diagram of a multilayer ceramic capacitor including a four-portion structure.

DETAILED DESCRIPTION OF THE PREFERRED EMBODIMENTS

Figure 1:
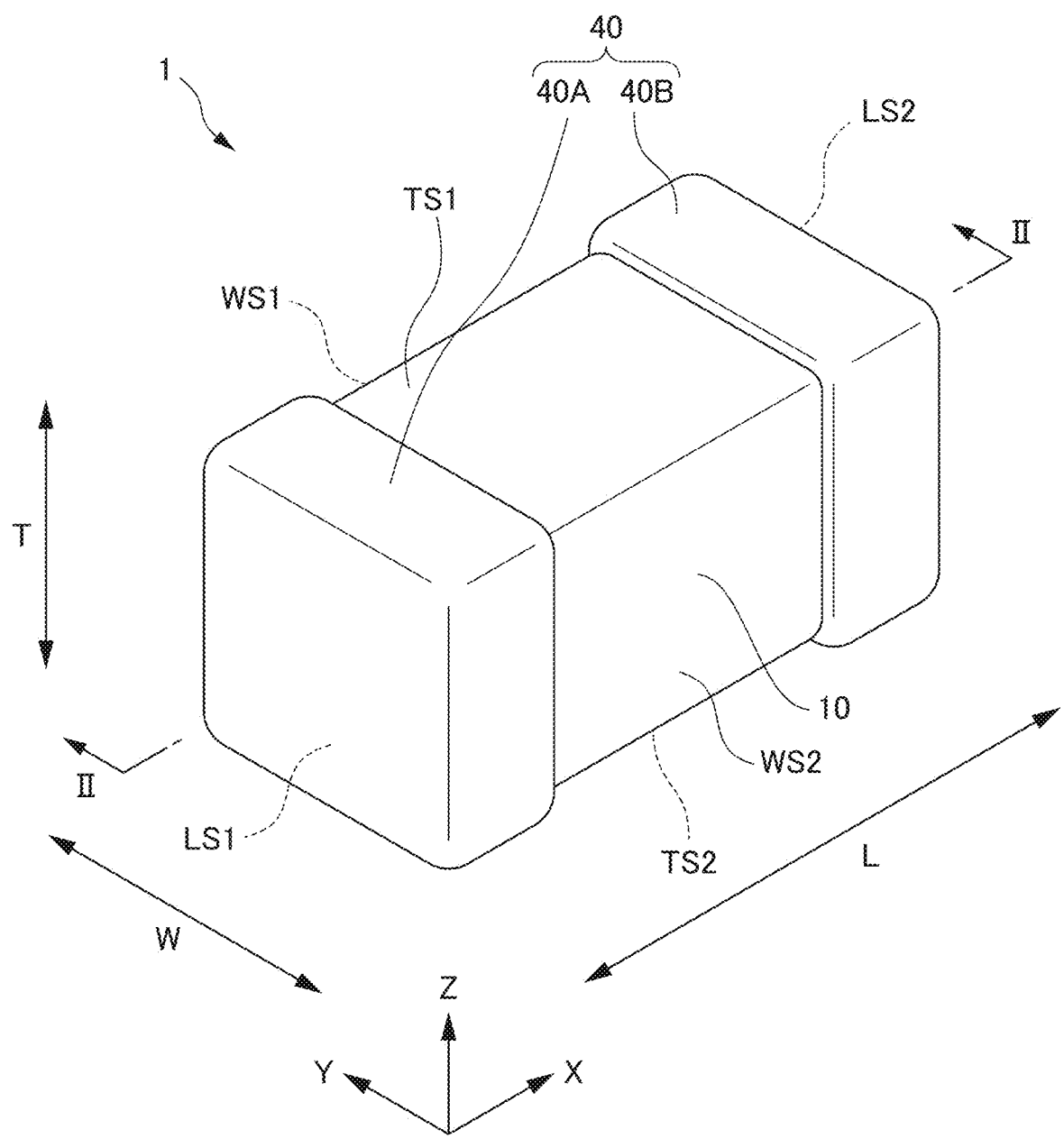
FIG. 1 is an external perspective view of a multilayer ceramic capacitor according to a preferred embodiment of the present invention.
Figure 2:
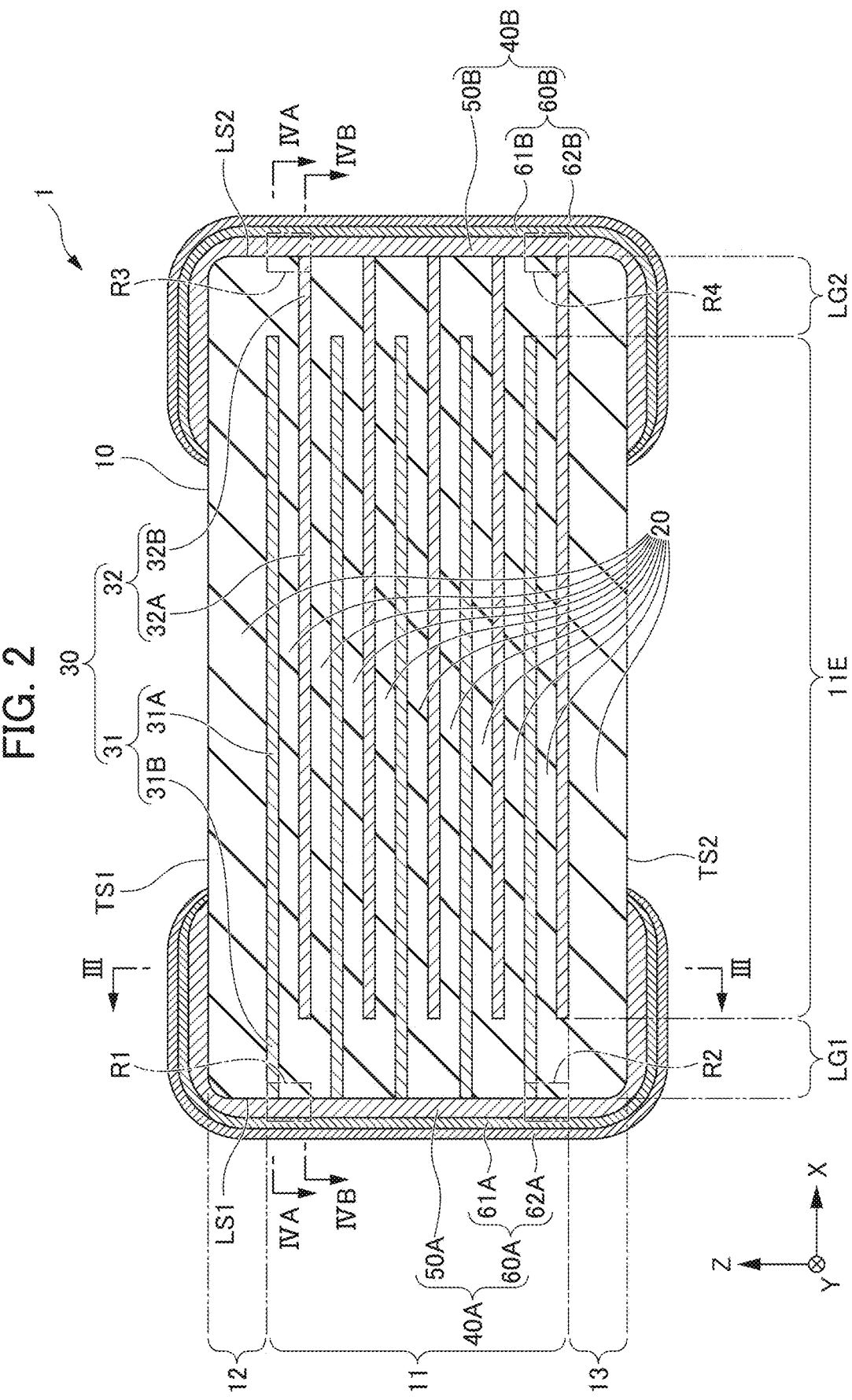
FIG. 2 is a cross-sectional view taken along the line II-II of FIG. 1.
Figure 3:
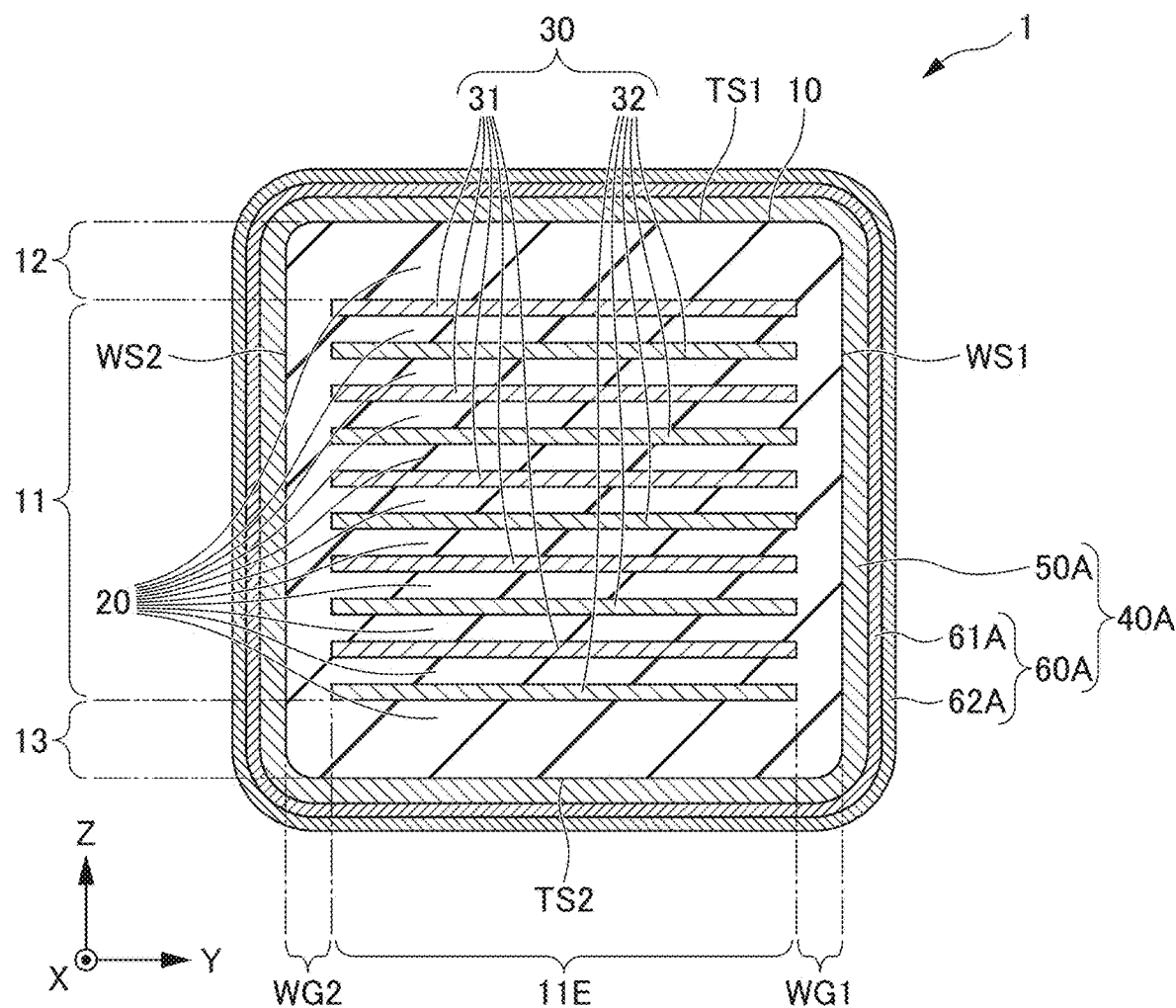
FIG. 3 is a cross-sectional view taken along the line III-III of FIG. 2.
Figure 4A:
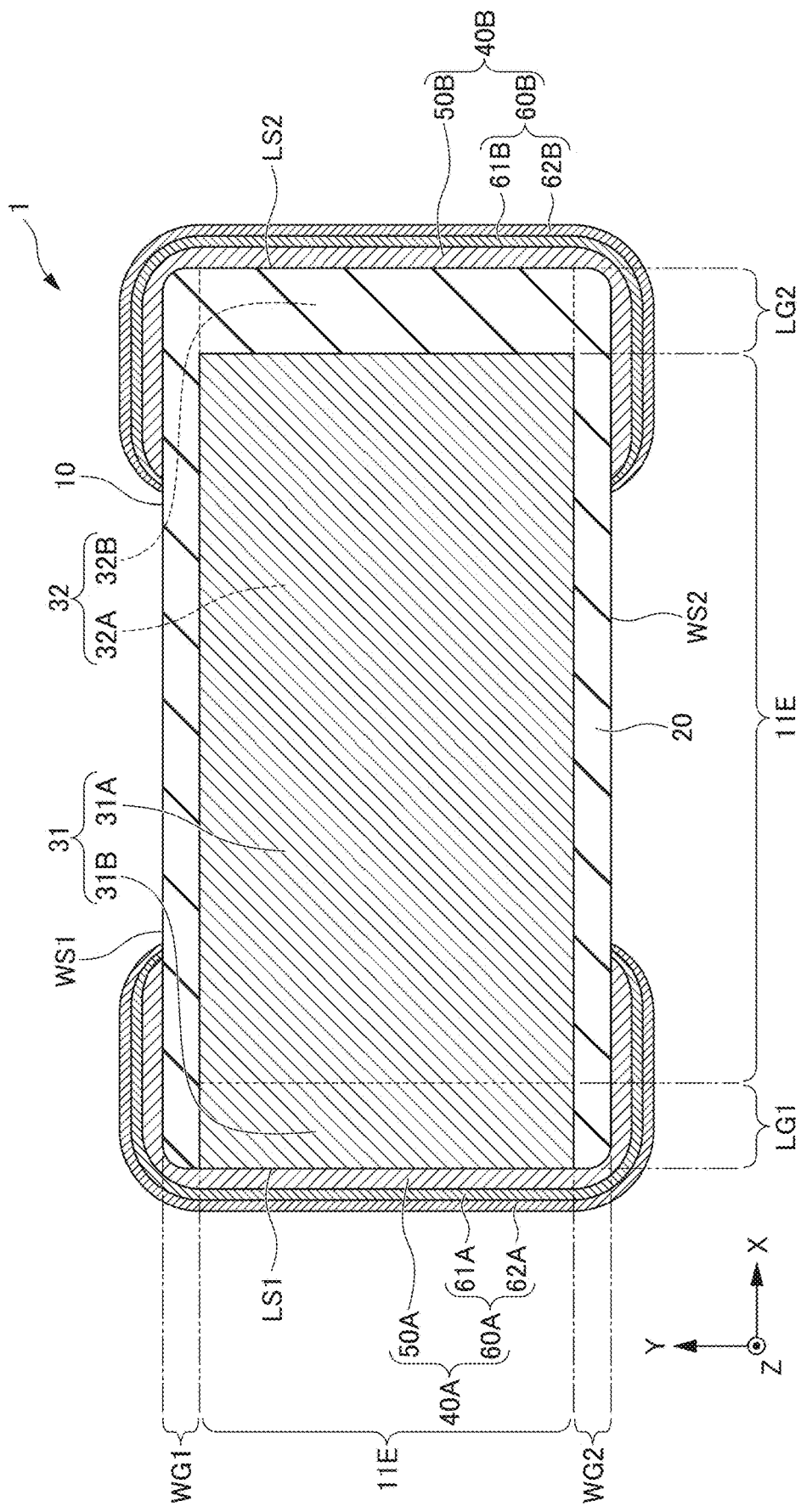
FIG. 4A is a cross-sectional view taken along the line IVA-IVA of FIG. 2.

Preferred embodiments of the present invention will be described below with reference to the drawings. Hereinafter, a multilayer ceramic capacitor 1 defining and functioning as a multilayer ceramic electronic component according to a preferred embodiment of the present invention of the present invention will be described. FIG. 1 is an external perspective view of a multilayer ceramic capacitor 1 according to a preferred embodiment. FIG. 2 is a cross-sectional view taken along the line II-II of FIG. 1. FIG. 3 is a cross-sectional view taken along the line III-III of FIG. 2. FIG. 4A is a cross-sectional view taken along the line IVA-IVA of FIG. 2. FIG. 4B is a cross-sectional view taken along the line IVB-IVB of FIG. 2.

As shown in FIG. 1, the multilayer ceramic capacitor 1 according to the present preferred embodiment has a rectangular or substantially rectangular parallelepiped shape. The multilayer ceramic capacitor 1 includes a multilayer body 10 having a rectangular or substantially rectangular parallelepiped shape, and a pair of external electrodes 40 provided at both end portions of the multilayer body 10 so as to be spaced apart from each other.

In FIG. 1, an arrow T indicates a lamination (stacking) direction of the multilayer ceramic capacitor 1 and the multilayer body 10. The lamination direction T is also referred to as a thickness direction and a height direction of the multilayer ceramic capacitor 1 and the multilayer body 10. In FIG. 1, the arrow L indicates a length direction orthogonal or substantially orthogonal to the lamination direction T of the multilayer ceramic capacitor 1 and the multilayer body 10. In FIG. 1, the arrow W indicates a width direction orthogonal or substantially orthogonal to the lamination direction T and the length direction L of the multilayer ceramic capacitor 1 and the multilayer body 10. The pair of external electrodes 40 is provided at one end and the other end of the multilayer body 10 in the length direction L.

FIGS. 1 to 4B show XYZ orthogonal coordinate systems. The length direction L of the multilayer ceramic capacitor 1 and the multilayer body 10 corresponds to the X direction. The width direction W of the multilayer ceramic capacitor 1 and the multilayer body 10 corresponds to the Y direction. The lamination direction T of the multilayer ceramic capacitor 1 and the multilayer body 10 corresponds to the Z direction. Here, the cross section shown in FIG. 2 is also referred to as an LT cross section. The cross section shown in FIG. 3 is also referred to as a WT cross section. The cross section shown in FIGS. 4A and 4B is also referred to as an LW cross section.

As shown in FIGS. 1 to 4B, the multilayer body 10 includes a first main surface TS1 and a second main surface TS2 which are opposed to each other in the lamination direction T, a first end surface LS1 and a second end surface LS2 which are opposed to each other in the length direction L orthogonal or substantially orthogonal to the lamination direction T, and a first lateral surface WS1 and a second lateral surface WS2 which are opposed to each other in the width direction W orthogonal or substantially orthogonal to the lamination direction T and the length direction L.

As shown in FIG. 1, the multilayer body 10 has a rectangular or substantially rectangular parallelepiped shape. The dimension in the length direction L of the multilayer body 10 may be longer than the dimension in the width direction W. The corner portions and ridge portions of the multilayer body 10 are preferably rounded. The corner portions are portions where the three surfaces of the multilayer body intersect, and the ridge portions are portions where the two surfaces of the multilayer body intersect. In addition, unevenness or the like may be provided on a portion or the whole of the surface of the multilayer body 10.

The dimensions of the multilayer body 10 are not particularly limited. However, when the dimension in the length direction L of the multilayer body 10 is defined as L dimension, the L dimension is preferably about 0.2 mm or more and about 6 mm or less, for example. When the dimension of the multilayer body 10 in the lamination direction T is defined as T dimension, the T dimension is preferably about 0.05 mm or more and about 5 mm or less, for example. When the dimension of the multilayer body 10 in the width direction W is defined as W dimension, the dimension W is preferably about 0.1 mm or more and about 5 mm or less, for example.

As shown in FIGS. 2 and 3, the multilayer body 10 includes an inner layer portion 11, and a first main surface-side outer layer portion 12 and a second main surface-side outer layer portion 13 that sandwich the inner layer portion 11 in the lamination direction T.

The inner layer portion 11 includes a plurality of dielectric layers 20 functioning as a plurality of ceramic layers and a plurality of internal electrode layers 30 functioning as a plurality of internal conductive layers which are alternately laminated in the lamination direction T. The inner layer portion 11 includes, in the lamination direction T, from the internal electrode layer 30 located closest to the first main surface TS1 to the internal electrode layer 30 located closest to the second main surface TS2. In the inner layer portion 11, a plurality of internal electrode layers 30 are opposed to each other with the dielectric layer 20 interposed therebetween. The inner layer portion 11 generates a capacitance and substantially defines and functions as a capacitor.

The plurality of dielectric layers 20 are each made of a dielectric material. The dielectric material may be a dielectric ceramic including a component such as $BaTiO_3$, $CaTiO_3$, $SrTiO_3$, or $CaZrO_3$. Furthermore, the dielectric material may be obtained by adding a secondary component such as a Mn compound, an Fe compound, a Cr compound, a Co compound, or a Ni compound to the main component. The dielectric material particularly preferably includes $BaTiO_3$ as a main component.

The thicknesses of the dielectric layers 20 are each preferably about 0.2 μm or more and about 10 μm or less, for example. The number of the dielectric layers 20 to be laminated (stacked) is preferably fifteen or more and 1200 or less, for example. The number of the dielectric layers 20 refers to the total number of dielectric layers 20 in the inner layer portion 11, and dielectric layers 20 in the first main surface-side outer layer portion 12 and the second main surface-side outer layer portion 13.

The plurality of internal electrode layers 30 includes a plurality of first internal electrode layers 31 functioning as a plurality of first internal conductive layers and a plurality of second internal electrode layers 32 functioning as a plurality of second internal conductive layers. The first internal electrode layers 31 and the second internal electrode layers 32 are alternately provided in the lamination direction T with the dielectric layers 20 interposed therebetween. The first internal electrode layers 31 each extend toward the first end surface LS1 and are each exposed at the first end surface LS1. The second internal electrode layers 32 each extend toward the second end surface LS2 and are each exposed at the second end surface LS2. In the following description, when it is not necessary to distinguish between the first internal electrode layer 31 and the second internal electrode layer 32, the first internal electrode layer 31 and the second internal electrode layer 32 may be collectively referred to as an internal electrode layer 30.

As shown in FIG. 4A, the first internal electrode layers 31 each include a first counter portion 31A and a first extension portion 31B. The first counter portion 31A is a region opposed to the second internal electrode layer 32 with the dielectric layer 20 interposed therebetween, and is located inside the multilayer body 10. The first extension portion 31B is a portion which extends from the first counter portion 31A toward the first end surface LS1, and is exposed at the first end surface LS1.

As shown in FIG. 4B, the second internal electrode layer 32 includes a second counter portion 32A and a second extension portion 32B. The second counter portion 32A is a region opposed to the first internal electrode layer 31 with the dielectric layer 20 interposed therebetween, and is located inside the multilayer body 10. The second extension portion 32B is a portion extending from the second counter portion 32A toward the second end surface LS2, and is exposed at the second end surface LS2.

In the present preferred embodiment, the first counter portion 31A and the second counter portion 32A are opposed to each other with the dielectric layer 20 interposed therebetween, such that a capacitance is generated, and the characteristics of a capacitor are developed.

The shapes of the first counter portion 31A and the second counter portion 32A are not particularly limited, but are preferably rectangular or substantially rectangular. However, the corner portions of the rectangular shape may be rounded, or the corner portions of the rectangular or substantially rectangular shape may be provided obliquely. The shapes of the first extension portion 31B and the second extension portion 32B are not particularly limited, but are preferably rectangular or substantially rectangular. However, the corner portions of the rectangular shape may be rounded, or the corner portions of the rectangular shape may be provided obliquely.

The dimension of the first counter portion 31A in the width direction W and the dimension of the first extension portion 31B in the width direction W may be the same, or either one of them may be smaller. The dimension of the second counter portion 32A in the width direction W and the dimension of the second extension portion 32B in the width direction W may be the same, or either one of them may be narrower.

The first internal electrode layers 31 and the second internal electrode layers 32 are each made of an appropriate electrically conductive material including a metal such as Ni, Cu, Ag, Pd or Au, or an alloy including at least one of these metals. When using an alloy, the first internal electrode layers 31 and the second internal electrode layers 32 may be each made of, for example, an Ag—Pd alloy.

The thicknesses of the first internal electrode layers 31 and the second internal electrode layers 32 are each preferably, for example, about 0.2 µm or more and about 2.0 µm or less. The total number of the first internal electrode layers 31 and the second internal electrode layers 32 is preferably fifteen or more and 1000 or less.

As shown in FIGS. 2 and 3, the first main surface side-outer layer portion 12 is located adjacent to the first main surface TS1 of the multilayer body 10. The first main surface side-outer layer portion 12 includes a plurality of dielectric layers 20 located between the first main surface TS1 and the internal electrode layer 30 closest to the first main surface TS1. On the other hand, the second main surface side-outer layer portion 13 is located adjacent to the second main surface TS2 of the multilayer body 10. The second main surface side-outer layer portion 13 includes a plurality of dielectric layers 20 located between the second main surface TS2 and the internal electrode layer 30 closest to the second main surface TS2. The dielectric layers 20 used in the first main surface side-outer layer portion 12 and the second main surface side-outer layer portion 13 may be the same as the dielectric layers 20 used in the inner layer portion 11.

The multilayer body 10 includes a counter electrode portion 11E. The counter electrode portion 11E is a portion where the first counter portion 31A of the first internal electrode layer 31 and the second counter portion 32A of the second internal electrode layer 32 are opposed to each other. The counter electrode portion 11E defines and functions as a portion of the inner layer portion 11. FIGS. 4A and 4B each show the range of the counter electrode portion 11E in the width direction W and the length direction L. The counter electrode portion 11E is also referred to as a capacitor active portion.

The multilayer body 10 includes lateral surface side-outer layer portions. The lateral surface side-outer layer portions include a first lateral surface side-outer layer portion WG1 and a second lateral surface side-outer layer portion WG2. The first lateral surface side-outer layer portion WG1 is a portion including the dielectric layer 20 located between the counter electrode portion 11E and the first lateral surface WS1. The second lateral surface side-outer layer portion WG2 is a portion including the dielectric layer 20 located between the counter electrode portion 11E and the second lateral surface WS2. FIGS. 3, 4A and 4B each show the ranges of the first lateral surface side-outer layer portion WG1 and the second lateral surface side-outer layer portion WG2 in the width direction W. The lateral surface side-outer layer portion is also referred to as a W gap or a side gap.

The multilayer body 10 includes end surface side-outer layer portions. The end surface side-outer layer portions include a first end surface side-outer layer portion LG1 and a second end surface side-outer layer portion LG2. The first end surface side-outer layer portion LG1 is a portion including the dielectric layer 20 and the first extension portion 31B located between the counter electrode portion 11E and the first end surface LS1. That is, the first end surface side-outer layer portion LG1 includes the portions of the plurality of dielectric layers 20 adjacent to the first end surface LS1 and the plurality of first extension portions 31B. The second end surface side-outer layer portion LG2 is a portion including the dielectric layer 20 and the second extension portion 32B located between the counter electrode portion 11E and the second end surface LS2. That is, the second end surface side-outer layer portion LG2 includes the portions of the plurality of dielectric layers 20 adjacent to the second end surface LS2 and the plurality of second extension portions 32B. FIGS. 2, 4A, and 4B each show the ranges of the first end surface side-outer layer portion LG1 and the second end surface side-outer layer portion LG2 in the length direction L. The end surface side-outer layer portion is also referred to as an L gap or an end gap.

As shown in FIGS. 1 and 2, the external electrodes 40 include a first external electrode 40A adjacent to the first end surface LS1 of the multilayer body 10 and a second external electrode 40B adjacent to the second end surface LS2 of the multilayer body 10.

It is to be noted that the basic configurations of the first external electrode 40A and the second external electrode 40B are the same. Furthermore, the first external electrode 40A and the second external electrode 40B have a shape that is substantially plane symmetrical with respect to the WT cross section at the center in the length direction L of the multilayer ceramic capacitor 1. Therefore, in the following description, when it is not necessary to distinguish between the first external electrode 40A and the second external electrode 40B, the first external electrode 40A and the second external electrode 40B may be collectively referred to as an external electrode 40.

The first external electrode 40A is provided on the first end surface LS1. The first external electrode 40A is in contact with the first extension portion 31B of each of the plurality of first internal electrode layers 31 exposed at the first end surface LS1. With such a configuration, the first external electrode 40A is electrically connected to the plurality of first internal electrode layers 31. The first external electrode 40A may be provided on a portion of the first main surface TS1 and a portion of the second main surface TS2, and also on a portion of the first lateral surface WS1 and a portion of the second lateral surface WS2. In the present preferred embodiment, the first external electrode 40A extends from the first end surface LS1 to a portion of the first main surface TS1 and to a portion of the second main surface TS2, and to a portion of the first lateral surface WS1 and to a portion of the second lateral surface WS2.

The second external electrode 40B is provided on the second end surface LS2. The second external electrode 40B is in contact with the second extension portion 32B of each of the plurality of second internal electrode layers 32 exposed at the second end surface LS2. With such a configuration, the second external electrode 40B is electrically connected to the plurality of second internal electrode layers 32. The second external electrodes 40B may be provided on a portion of the first main surface TS1 and a portion of the second main surface TS2, and also on a portion of the first lateral surface WS1 and a portion of the second lateral surface WS2. In the present preferred embodiment, the second external electrode 40B extends from the second end surface LS2 to a portion of the first main surface TS1 and to a portion of the second main surface TS2, and to a portion of the first lateral surface WS1 and a portion of the second lateral surface WS2.

As described above, in the multilayer body 10, the capacitance is generated by the first counter portions 31A of the first internal electrode layers 31 and the second counter portions 32A of the second internal electrode layers 32 which are opposed to each other with the dielectric layers 20 interposed therebetween. Therefore, characteristics of the capacitor are provided between the first external electrode 40A to which the first internal electrode layers 31 are connected and the second external electrode 40B to which the second internal electrode layers 32 are connected.

As shown in FIGS. 2, 4A, and 4B, the first external electrode 40A includes a first base electrode layer 50A and a first plated layer 60A provided on the first base electrode layer 50A. Furthermore, the second external electrode 40B includes a second base electrode layer 50B and a second plated layer 60B provided on the second base electrode layer 50B.

The first base electrode layer 50A is provided on the first end surface LS1. The first base electrode layer 50A is connected to the first extension portion 31B of each of the plurality of first internal electrode layers 31 exposed at the first end surface LS1. In the present preferred embodiment, the first base electrode layer 50A extends from the first end surface LS1 to a portion of the first main surface TS1 and to a portion of the second main surface TS2, and to a portion of the first lateral surface WS1 and to a portion of the second lateral surface WS2.

The second base electrode layer 50B is provided on the second end surface LS2. The second base electrode layer 50B is in contact with the second extension portion 32B of each of the plurality of second internal electrode layers 32 exposed at the second end surface LS2. In the present preferred embodiment, the second base electrode layer 50B extends from the second end surface LS2 to a portion of the first main surface TS1 and to a portion of the second main surface TS2, and to a portion of the first lateral surface WS1 and to a portion of the second lateral surface WS2.

The first base electrode layer 50A and the second base electrode layer 50B of the present preferred embodiment are fired layers. It is preferable that the fired layers each include both a metal component, and either a glass component or a ceramic component, or both the glass component and the ceramic component. The metal component includes, for example, at least one selected from Cu, Ni, Ag, Pd, Ag—Pd alloys, Au, and the like. The glass component includes, for example, at least one selected from B, Si, Ba, Mg, Al, Li, and the like. As the ceramic component, the same or substantially same ceramic material as that of the dielectric layer 20 may be used, or a different ceramic material may be used. Ceramic components include, for example, at least one selected from $BaTiO_3$, $CaTiO_3$, $(Ba, Ca)TiO_3$, $SrTiO_3$, $CaZrO_3$, and the like.

The fired layer is obtained by, for example, applying an electrically conductive paste including glass and metal to the multilayer body 10 and firing it. The fired layer can be obtained by simultaneously firing (cofiring) a multilayer chip before firing, which is a material of the multilayer body 10 having a plurality of internal electrodes and dielectric layers, and an electrically conductive paste applied to the multilayer chip. Alternatively, the multilayer chip may be fired to obtain the multilayer body 10, following which an electrically conductive paste may be applied to the multilayer body 10 and the resulting product may be fired. In a case of the above-described cofiring, it is preferable that the fired layer is formed by baking a ceramic material added instead of the glass component. In such a case, it is particularly preferable to use, as the ceramic material to be added, the same or substantially the same kind of ceramic material as the dielectric layer 20. The fired layer may include a plurality of layers.

The thickness of the first base electrode layer 50A located on the first end surface LS1 in the length direction L is preferably, for example, about 10 μm or more and about 200 μm or less at the center of the first base electrode layer 50A in the lamination direction T and the width direction W.

The thickness of the second base electrode layer 50B located on the second end surface LS2 in the length direction L is preferably, for example, about 10 μm or more and about 200 μm or less at the center of the second base electrode layer 50B in the lamination direction T and the width direction W.

When providing the first base electrode layer 50A to at least one of portions of the first main surface TS1 and the second main surface TS2, the thickness in the lamination direction T of the first base electrode layer 50A provided at this portion is preferably about 3 μm or more and about 40 μm or less at the center in the length direction L and the width direction W of the first base electrode layer 50A provided at this portion, for example.

When providing the first base electrode layer 50A to portions of at least one of the first lateral surface WS1 and the second lateral surface WS2, the thickness in the width direction W of the first base electrode layer 50A provided at this portion is preferably about 3 μm or more and about 40 μm or less at the center in the length direction L and the height direction T of the first base electrode layer 50A provided at this portion, for example.

When providing the second base electrode layer 50B to portions of at least one of the first main surface TS1 and the second main surface TS2, the thickness in the lamination direction T of the second base electrode layer 50B provided at this portion is preferably about 3 μm or more and about 40 μm or less at the center in the length direction L and the width direction W of the second base electrode layer 50B provided at this portion, for example.

When providing the second base electrode layer 50B to portions of at least one of the first lateral surface WS1 and the second lateral surface WS2, the thickness in the width direction W of the second base electrode layer 50B provided at this portion is preferably about 3 μm or more and about 40 μm or less at the center in the length direction L and the height direction T of the second base electrode layer 50B provided at this portion, for example.

The first plated layer 60A covers the first base electrode layer 50A.

The second plated layer 60B covers the second base electrode layer 50B.

The first plated layer 60A and the second plated layer 60B may each include at least one selected from Cu, Ni, Sn, Ag, Pd, a Ag—Pd alloy, Au, and the like. The first plated layer 60A and the second plated layer 60B may each include a plurality of layers. The first plated layer 60A and the second plated layer 60B each preferably include a two-layer structure including a Sn plated layer on a Ni plated layer.

The first plated layer 60A covers the first base electrode layer 50A. In the present preferred embodiment, the first plated layer 60A includes a first Ni plated layer 61A, and a first Sn plated layer 62A provided on the first Ni plated layer 61A.

The second plated layer 60B covers the second base electrode layer 50B. In the present preferred embodiment, the second plated layer 60B includes a second Ni plated layer 61B, and a second Sn plated layer 62B provided on the second Ni plated layer 61B.

The Ni plated layer prevents the first base electrode layer 50A and the second base electrode layer 50B from being eroded by solder when mounting the multilayer ceramic capacitor 1. Furthermore, the Sn plated layer improves the wettability of the solder when mounting the multilayer ceramic capacitor 1. This facilitates the mounting of the multilayer ceramic capacitor 1. The thickness of each of the first Ni plated layer 61A, the first Sn plated layer 62A, the second Ni plated layer 61B, and the second Sn plated layer 62B is preferably about 2 μm or more and about 10 μm or less, for example.

The external electrode 40 of the present preferred embodiment may include an electrically conductive resin layer including electrically conductive particles and a thermosetting resin, for example. The electrically conductive resin layer may cover the fired layer. When the electrically conductive resin layer covers the fired layer, the electrically conductive resin layer is provided between the fired layer and the plated layers (the first plated layer 60A and the second plated layer 60B). The electrically conductive resin layer may completely cover the fired layer or may partially cover the fired layer.

The electrically conductive resin layer including a thermosetting resin is more flexible than an electrically conductive layer made of, for example, a plated film or a fired product of an electrically conductive paste. Therefore, even when an impact caused by physical shock or thermal cycle is applied to the multilayer ceramic capacitor 1, the electrically conductive resin layer defines and functions as a buffer layer. Therefore, the electrically conductive resin layer reduces or prevents the occurrence of cracking in the multilayer ceramic capacitor 1.

Metals of the electrically conductive particles may be, for example, Ag, Cu, Ni, Sn, Bi or alloys including them. The electrically conductive particle preferably includes Ag, for example. The electrically conductive particle is a metal powder of Ag, for example. Ag is suitable as an electrode material because of its lowest resistivity among metals. In addition, since Ag is a noble metal, it is not likely to be oxidized, and weatherability thereof is high. Therefore, the metal powder of Ag is suitable as the electrically conductive particle.

Furthermore, the electrically conductive particle may be a metal powder coated on the surface of the metal powder with Ag. When using those coated with Ag on the surface of the metal powder, the metal powder is preferably Cu, Ni, Sn, Bi, or an alloy powder thereof. In order to make the metal of the base material inexpensive while keeping the characteristics of Ag, it is preferable to use a metal powder coated with Ag.

Furthermore, the electrically conductive particle may be formed by subjecting Cu and Ni to an oxidation prevention treatment. Furthermore, the electrically conductive particle may be a metal powder coated with Sn, Ni, and Cu on the surface of the metal powder. When using those coated with Sn, Ni, and Cu on the surface of the metal powder, the metal powder is preferably Ag, Cu, Ni, Sn, Bi, or an alloy powder thereof.

The shape of the electrically conductive particle is not particularly limited. For the electrically conductive particle, a spherical metal powder, a flat metal powder, or the like can be used. However, it is preferable to use a mixture of a spherical metal powder and a flat metal powder.

The electrically conductive particles included in the electrically conductive resin layer mainly play a role of ensuring the conductivity of the electrically conductive resin layer. Specifically, by a plurality of electrically conductive particles being in contact with each other, an energization path is provided inside the electrically conductive resin layer.

The resin of the electrically conductive resin layer may include, for example, at least one selected from a variety of known thermosetting resins such as epoxy resin, phenolic resin, urethane resin, silicone resin, polyimide resin, and the like. Among those, epoxy resin is excellent in heat resistance, moisture resistance, adhesion, etc., and thus is one of the most preferable resins. Furthermore, it is preferable that the resin of the electrically conductive resin layer include a curing agent together with a thermosetting resin. When epoxy resin is used as a base resin, the curing agent for the epoxy resin may be various known compounds such as phenols, amines, acid anhydrides, imidazoles, active esters, and amide-imides.

The electrically conductive resin layer may include a plurality of layers. The thickest portion of the electrically conductive resin layer is preferably about 10 μm or more and about 150 μm or less, for example.

The basic configuration of the multilayer ceramic capacitor 1 according to the preferred embodiment is described as above. When the dimension in the length direction of the multilayer ceramic capacitor 1 including the multilayer body 10 and the external electrodes 40 is defined as the L dimension, the L dimension is preferably about 0.2 mm or more and about 6 mm or less, for example. Furthermore, when the dimension in the lamination direction of the multilayer ceramic capacitor 1 is defined as the T dimension, the T dimension is preferably about 0.05 mm or more and about 5 mm or less, for example. Furthermore, when the dimension in the width direction of the multilayer ceramic capacitor 1 is defined as the W dimension, the W dimension is preferably about 0.1 mm or more and about 5 mm or less, for example.

The inventors of preferred embodiments of the present invention thoroughly conducted investigations, experiments, and simulations, and have discovered that it is desirable to set the base electrode layer in direct contact with the multilayer body, i.e., the non-metal portion included in the first base electrode layer 50A and the second base electrode layer 50B of the present preferred embodiment in an appropriate state in order to improve the moisture-resistance reliability of the multilayer ceramic capacitors. This point will be described below.

Figure 5:
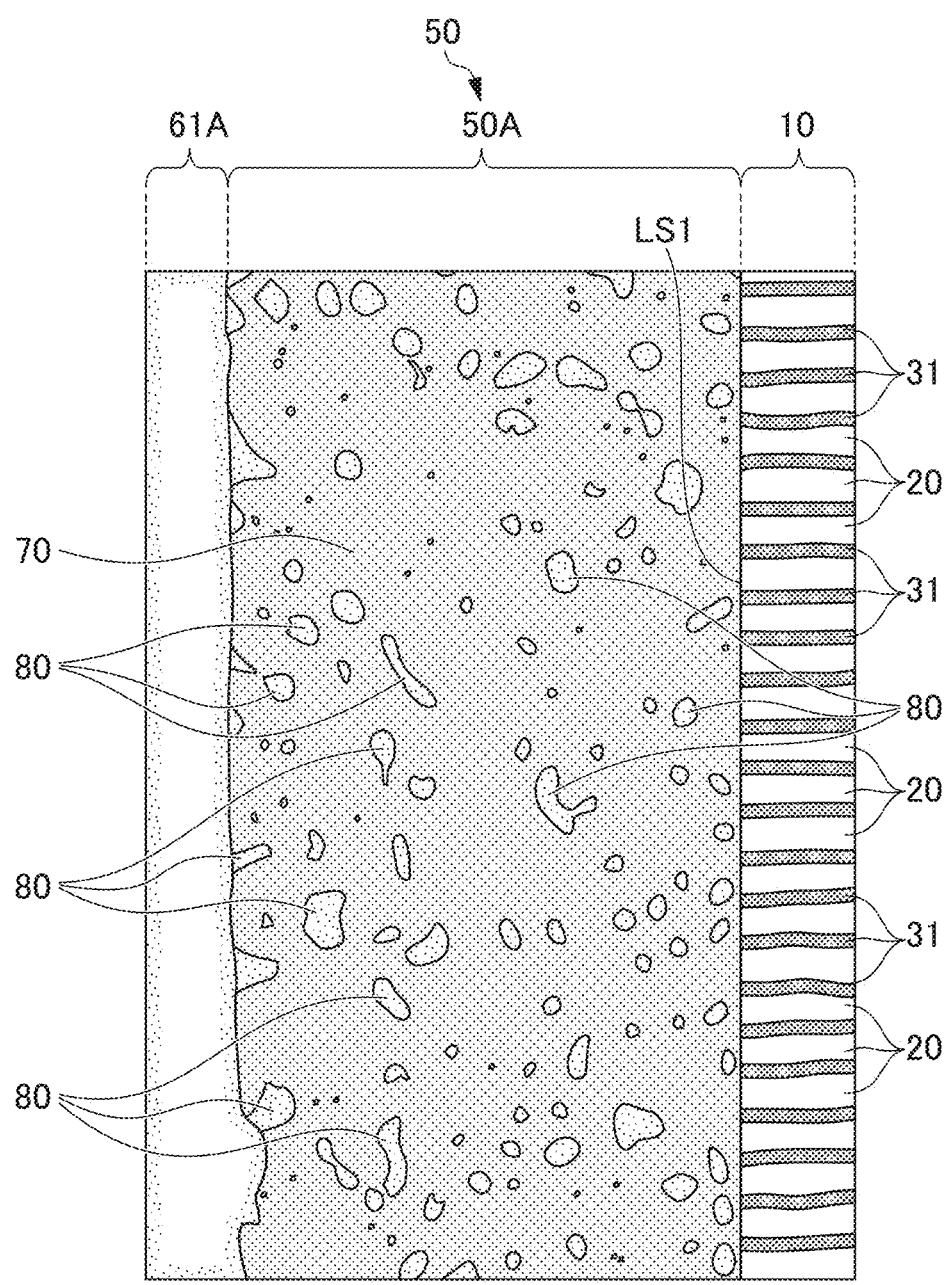
FIG. 5 is an enlarged cross-sectional view based on an SEM photograph of a portion indicated by R1 in FIG. 2.

FIG. 5 is an enlarged cross-sectional view based on an SEM (scanning electron microscope) photograph of a portion indicated by R1 in FIG. 2. FIG. 5 is a portion of an LT cross section perpendicular or substantially perpendicular to the width direction W of the multilayer body 10 in the multilayer ceramic capacitor 1. FIG. 5 shows the first base electrode layer 50A, a portion of the first Ni plated layer 61A, and a portion of the multilayer body 10. FIG. 5 shows the dielectric layer 20 and the plurality of first internal electrode layers 31 in the multilayer body 10. The first base electrode layer 50A is in contact with the first internal electrode layer 31 exposed at the first end surface LS1 of the multilayer body 10.

The second base electrode layer 50B of the present preferred embodiment also includes a cross-sectional structure similar to that of FIG. 5. Therefore, the structure of the first base electrode layer 50A, which will be described with reference to FIG. 5, is the structure of the second base electrode layer 50B. In the following description, when it is not necessary to distinguish between the first base electrode layer 50A and the second base electrode layer 50B, the first base electrode layer 50A and the second base electrode layer 50B may be collectively referred to as a base electrode layer 50.

As shown in FIG. 5, the base electrode layer 50 includes a metal portion 70 and a plurality of non-metal portions 80 existing in the metal portion 70.

The metal portion 70 includes at least one metal component selected from Cu, Ni, Ag, Pd, an Ag—Pd alloy, Au, and the like included in the fired layer of the base electrode layer 50. The plurality of non-metal portions 80 are dispersed in the metal portion 70.

Although the plurality of non-metal portions 80 are mainly voids, all the plurality of non-metal portions 80 may not be voids, and some of the plurality of non-metal portions 80 may include or partially include a glass component including Ba or Si. Furthermore, all the non-metal portion 80 may be made of a glass component including Ba or Si. The plurality of non-metal portions 80 have different circularities and average areas.

In the base electrode layer 50 of the present preferred embodiment, the average area of the plurality of non-metal portions 80 in the first population including the non-metal portions 80 having a circularity of about 0.4 or less is preferably about 12 μm² or less in the LT cross-sectional view perpendicular or substantially perpendicular to the width direction W as shown in FIG. 5, for example.

Furthermore, in the base electrode layer 50 of the present preferred embodiment, the proportion of the non-metal portions 80 is preferably about 17.2% or less in the LT cross-sectional view perpendicular or substantially perpendicular to the width direction W as shown in FIG. 5, for example.

In the multilayer ceramic capacitor 1 of the present preferred embodiment, non-metal portions 80 each having a low circularity among the non-metal portions 80 existing in the base electrode layer 50 have relatively small areas. In the multilayer ceramic capacitor including the base electrode layer, the base electrode layer typically includes non-metal portions such as the non-metal portions 80 of the present preferred embodiment.

The non-metal portions 80 each define and function as a path through which moisture enters the inside from the outside. This may lower the moisture resistance reliability of the multilayer ceramic capacitor 1. In particular, when the proportion of the non-metal portions 80 existing in the base electrode layer 50 increases, moisture resistance reliability tends to decrease. In addition, even when the proportion of the non-metal portions 80 is not so high, for example, when the non-metal portion 80 has a long and thin shape, there is a possibility that a structure in which moisture is likely to penetrate may be formed depending on the direction in the length direction of the non-metal portion 80 or the degree of connection of the plurality of non-metal portions 80. In order to improve the moisture resistance reliability of the multilayer ceramic capacitor 1, it is conceivable to increase the thickness of the base electrode layer 50. However, in such a case, the chip size of the multilayer ceramic capacitor 1 becomes large, thus preventing the reduction in size of the components. When the size of the multilayer ceramic capacitor 1 is not changed, the thickness of the base electrode layer 50 is increased to reduce the size of the multilayer body 10, resulting in a decrease in the capacitance of the capacitor.

Figure 6:
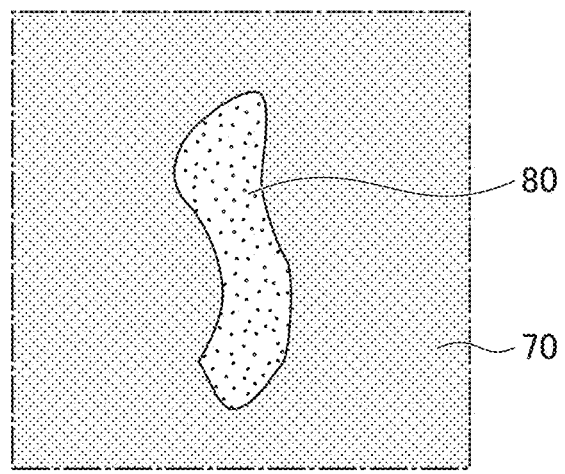
FIG. 6 is a diagram of an example of a non-metal portion having a relatively low circularity.

FIG. 6 shows an example of the non-metal portion 80 having a relatively low circularity. The non-metal portion 80 has a circularity of about 0.25, for example. When there are a plurality of non-metal portions 80 having a low circularity and the plurality of non-metal portions 80 are large in size, moisture may easily enter the non-metal portions 80.

In the present preferred embodiment, in the LT cross-sectional view of the base electrode layer 50, when the population of non-metal portions 80 each having a circularity of about 0.4 or less is taken as a first population, the average area of the plurality of non-metal portions 80 of the first population is about 12 μm² or less, and specifically, in the region shown in FIG. 5, the average area is about 6.3 μm², for example. With such a configuration, even when the non-metal portions 80 are included in the base electrode layer 50, the non-metal portions 80 each having a low degree of circularity, which facilitates the penetration of moisture, are small in size, such that the non-metal portions 80 are each less likely to define and function as a path through which moisture penetrates. Therefore, it is possible to improve moisture resistance reliability.

In the present preferred embodiment, the average area of the plurality of non-metal portions 80 of the first population is preferably about 2 μm² or more and about 12 μm² or less, and more preferably about 2 μm² or more and about 9 μm² or less, for example. This further improves moisture resistance reliability.

In the multilayer ceramic capacitor 1 of the present preferred embodiment, the proportion of the non-metal portions 80 existing in the base electrode layer 50 in the LT cross-sectional view may be, for example, about 1% or more and about 30% or less, and is preferably about 17.2% or less. More specifically, the proportion of the non-metal portions 80 existing in the base electrode layer 50 is preferably about 1.5% or more and about 17.2% or less, and more preferably about 5% or more and about 15% or less, for example. Even when the non-metal portion 80 is included in the base electrode layer 50 and the proportion of the non-metal portions 80 existing in the base electrode layer 50 falls within such a range, it is possible to achieve the advantageous effect of the present preferred embodiment, that is, the advantageous effect of improving moisture resistance reliability.

Next, a method of measuring various parameters such as the circularity of the non-metal portion 80, the average area of the non-metal portions 80, and the proportion of the non-metal portions 80 existing in the base electrode layer 50 in the present preferred embodiment will be described.

First, the multilayer ceramic capacitor 1 is polished from the first lateral surface WS1 or the second lateral surface WS2 to a position located at about ½ of the width direction W. Thereby, the LT cross section at the middle position in the width direction W of the multilayer ceramic capacitor 1 is exposed. Next, the LT cross section exposed by polishing is observed by SEM. Specifically, a portion including the base electrode layer 50 in the LT cross section is imaged as a reflected electron image. In the reflected electron image, the difference in resistance value is reflected as contrast, the metal portion 70 appears relatively white, and the non-metal portion 80 appears darker than the metal portion 70. It is to be noted that the imaging magnification is set to 2000 times, and a portion of the base electrode layer 50 in the reflected electron image is set as an analysis target range.

A total of four reflected electron images of two locations of the first base electrode layer 50A and two locations of the second base electrode layer 50B are obtained. In FIG. 2, four positions of the reflected electron image acquisition are indicated by R1, R2, R3, and R4. R1 refers to a portion closest to the first main surface TS1 of the first base electrode layer 50A in contact with the inner layer portion 11 of the multilayer body 10. R2 refers to a portion closest to the second main surface TS2, of the first base electrode layer 50A in contact with the inner layer portion 11 of the multilayer body 10. R3 refers to a portion closest to the first main surface TS1, of the second base electrode layer 50B in contact with the inner layer portion 11 of the multilayer body 10. R4 refers to a portion closest to the second main surface TS2, of the second base electrode layer 50B in contact with the inner layer portion 11 of the multilayer body 10. All of the lengths of R1, R2, R3, and R4 in the lamination direction T are about 80 µm, for example.

In the base electrode layer 50, the four regions corresponding to the respective reflected electron image acquisition positions R1, R2, R3, and R4 are likely to have a small thickness, which is a dimension corresponding to the length direction L, and have a high degree of influence on moisture resistance reliability. Therefore, the state of the base electrode layer 50 in these portions is important from the viewpoint of moisture resistance reliability.

The acquired reflected electron image is binarized by the image analysis software "WinROOF" (available from Mitani Corporation) to identify the metal portion 70 and a plurality of non-metal portions 80 existing in the metal portion 70. Using the binarized image, various parameters such as the area of each non-metal portion 80 existing in the base electrode layer 50 are calculated. Furthermore, the proportion of the non-metal portions 80 existing in the base electrode layer 50 is calculated.

The area of the non-metal portion 80 is calculated based on the binarized image obtained by binarizing the reflected electron image. When the area of the non-metal portion 80 is less than about 2.0 µm², it may be noise instead of the non-metal portion 80. Therefore, in order to exclude the influence of noise, the non-metal portions 80 of less than about 2.0 µm² are excluded from the analysis target.

For each non-metal portion 80, the circularity of the non-metal portion 80 is calculated by the following equation (1) based on the area of the non-metal portion 80 and the circumference (the length of the outline) of the non-metal portion 80.

$$\text{Circularity} = 4\pi \times (\text{area})/(\text{circumferential length})^2 \quad (1)$$

A set of non-metal portions 80 having a circularity of about 0.4 or less among all the non-metal portions 80 (excluding those having an area of less than about 2.0 µm² as described above) identified in the analysis target range of the reflected electron images acquired at the four locations of the reflected electron image acquisition positions R1, R2, R3, and R4 is set as the first population. The average area of the non-metal portions 80 in the first population is calculated based on the area of each non-metal portion 80 of the first population.

Based on the area of the analysis target range and the area of the non-metal portion 80, the proportion of the non-metal portion 80 existing in the base electrode layer 50 is calculated by the following equation (2).

$$\text{Proportion (\%) of the non-metal portion} = (\text{area of the non-metal portion/area of the analysis target range}) \times 100 \quad (2)$$

For each of the four analysis target ranges (R1, R2, R3, and R4), the proportion of the non-metal portions 80 is calculated. Then, the average value is calculated as the proportion of the non-metal portion 80 of the present preferred embodiment.

As described above, the measurement target range for calculating the average area of the non-metal portions 80 existing in the first population of the non-metal portions 80 having a circularity of about 0.4 or less is a set of the analysis target ranges at the four locations (R1, R2, R3, and R4) described above. Specifically, the measurement target ranges are portions adjacent to the first main surface TS1 and portions adjacent to the second main surface TS2 of the first base electrode layer 50A and the second base electrode layer 50B, which are in contact with the inner layer portion 11 of the multilayer body 10. More specifically, the measurement target ranges are a portion, in the first base electrode layer 50A and the second base electrode layer 50B, from the position of the boundary portion in the lamination direction between the inner layer portion 11 and the first outer layer portion 12 of the multilayer body 10 to the position of 80 µm toward the center in the lamination direction of the multilayer body 10, and a portion, in the first base electrode layer 50A and the second base electrode layer 50B, from the position of the boundary portion in the lamination direction between the inner layer portion 11 and the second outer layer portion 13 of the multilayer body 10 to the position of about 80 µm toward the center in the lamination direction of the multilayer body 10.

Next, a non-limiting example of a method of manufacturing the multilayer ceramic capacitor 1 of the present preferred embodiment will be described. The method of manufacturing the multilayer ceramic capacitor 1 of the present preferred embodiment is not limited as long as it satisfies the above-mentioned requirements. However, a preferred manufacturing method includes the following steps, for example. The details of each step will be described below.

A dielectric sheet for manufacturing the dielectric layer 20 and an electrically conductive paste for manufacturing the internal electrode layer 30 are prepared. Both the dielectric sheet for the dielectric layer 20 and the electrically conductive paste for the internal electrode layer 30 include a binder and a solvent. The binders and solvents may be known. The paste made of an electrically conductive material is, for example, a paste obtained by adding an organic binder and an organic solvent to metal powder.

An electrically conductive paste for manufacturing the internal electrode layer 30 is printed on the dielectric sheet by using a printing plate designed to have the shape of the internal electrode layer 30 of the present preferred embodiment, for example, by screen printing or gravure printing. With such a configuration, a dielectric sheet having a pattern of the first internal electrode layer 31 provided thereon and a dielectric sheet having a pattern of the second internal electrode layer 32 provided thereon are prepared.

By laminating a predetermined number of dielectric sheets on which patterns of the internal electrode layers 30 are not printed, a portion defining and functioning as the first main surface side-outer layer portion 12 adjacent to the first main surface TS1 is formed. On top of that, the dielectric sheets on which the pattern of the first internal electrode layer 31 is printed and the dielectric sheets on which the pattern of the second internal electrode layer 32 is printed are sequentially and alternately laminated to form a portion defining and functioning as the inner layer portion 11. A predetermined number of dielectric sheets on which patterns of the internal electrode layers 30 are not printed are laminated on the portion defining and functioning as the inner layer portion 11 to form a portion defining and functioning as the second main surface side-outer layer portion 13 adjacent to the second main surface TS2. Thus, a multilayer sheet is obtained.

Next, the multilayer sheet is pressed in the laminating direction by hydrostatic pressing or other methods to prepare a multilayer block.

Next, the multilayer block is cut to a predetermined size and divided into individual pieces to obtain a plurality of multilayer chips. Thereafter, the multilayer chips may be polished by barrel polishing or the like to round the corner portions and the ridge portions.

Next, the multilayer chips are fired to obtain the multilayer body 10. The firing temperature at this time depends on the materials of the dielectric layer 20 and the internal electrode layer 30, but is preferably about 900° C. or higher and about 1400° C. or lower, for example.

The electrically conductive paste defining and functioning as the base electrode layer 50 is applied to both end surfaces of the multilayer body 10. In the present preferred embodiment, the base electrode layer 50 is a fired layer. The fired layer can be formed by applying an electrically conductive paste including a glass component and a metal to the multilayer body 10 by a method such as dipping, and then performing firing treatment. The temperature of the firing treatment at this time is preferably about 700° C. or higher and about 900° C. or lower.

Furthermore, the multilayer chips before firing and the electrically conductive paste applied to the multilayer chip may be fired simultaneously. In such a case, the fired layer is preferably formed by firing a ceramic material added instead of the glass component. At this time, it is particularly preferable to use, as the ceramic material to be added, the same kind of ceramic material as the dielectric layer 20. In this case, an electrically conductive paste is applied to the multilayer chip before firing, and the multilayer chip and the electrically conductive paste applied to the multilayer chip are fired at the same time to form the multilayer body 10 in which the fired layer is formed.

By changing the shape and particle size distribution of the copper powder added to the electrically conductive paste, it is possible to control the circularity of the non-metal portions 80 existing in the base electrode layer 50. The circularity of the non-metal portions 80 improves with using the spherical powder as the copper powder and sharper particle size distribution of the copper powder. Conversely, the circularity of the non-metal portion 80 decreases with using flat powder as the copper powder and a broader particle size distribution of the copper powder.

It is possible to control the average area of the non-metal portions 80 existing in the base electrode layer 50 by changing the particle diameter and firing temperature of the copper powder and the glass component. As the particle diameters of the copper powder and the glass component are smaller and the firing temperature is higher, the average area of the non-metal portion 80 becomes smaller. Conversely, as the particle diameters of the copper powder and the glass component are larger and the firing temperature is lower, the average area of the non-metal portion 80 becomes larger.

It is possible to control the proportion of the non-metal portions 80 existing in the base electrode layer 50 by changing the addition of the glass component and the firing temperature. As the addition of the glass component is larger and the firing temperature is higher, the proportion of the non-metal portions 80 becomes higher. Conversely, as the addition of the glass component is smaller and the firing temperature is lower, the proportion of the non-metal portions 80 becomes lower. The composition of the electrically conductive paste includes about 50 vol % or more and about 80 vol % or less of the copper powder, about 5 vol % or more and about 20 vol % or less of the glass component, and other solvents and resin components, for example.

Thereafter, the plated layer is formed on the surface of the base electrode layer 50 including the fired layer. In the present preferred embodiment, the first plated layer 60A is formed on the surface of the first base electrode layer 50A. Furthermore, the second plated layer 60B is formed on the surface of the second base electrode layer 50B. In the present preferred embodiment, the Ni plated layer and the Sn plated layer are formed as the plated layers. Upon performing the plating process, electrolytic plating or electroless plating may be adopted. However, the electroless plating has a disadvantage in that a pretreatment with a catalyst or the like is necessary in order to improve the plating deposition rate, and thus the process is complicated. Therefore, normally, electrolytic plating is preferably adopted. The Ni plated layer and Sn the plated layer are sequentially formed, for example, by barrel plating.

When the electrically conductive resin layer is provided, the electrically conductive resin layer may cover the fired layer. When the electrically conductive resin layer is provided, an electrically conductive resin paste including a thermosetting resin and a metal component is applied on the fired layer, and then heat treatment is performed at a temperature of about 250° C. to about 550° C. or higher, for example. Thus, the thermosetting resin is thermally cured to form the electrically conductive resin layer. The atmosphere during the heat treatment is preferably an $N_2$ atmosphere. Furthermore, in order to prevent scattering of the resin and to prevent oxidation of various metal components, the oxygen concentration is preferably about 100 ppm or less.

The multilayer ceramic capacitor 1 preferably is manufactured by the manufacturing process described above, for example.

The configuration of the multilayer ceramic capacitor 1 is not limited to the configuration shown in FIGS. 1 to 4B. For example, the multilayer ceramic capacitor 1 may include a two-portion structure, a three-portion structure, or a four-portion structure as shown in FIGS. 7A to 7C.

Figure 7A:
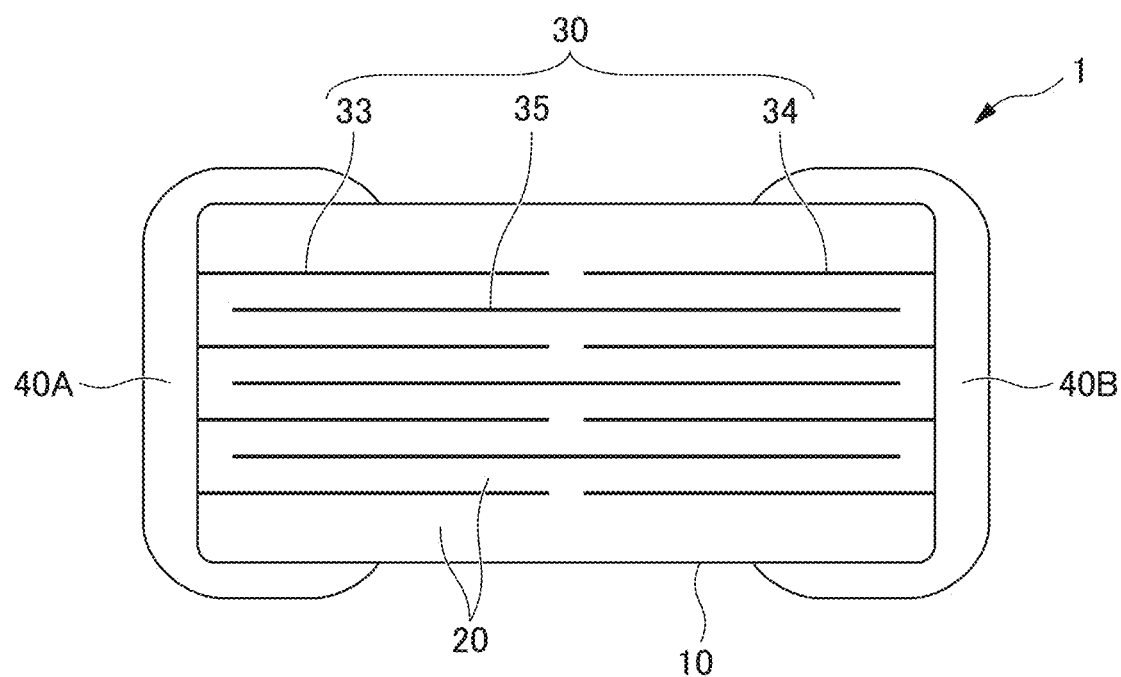
FIG. 7A is a diagram of a multilayer ceramic capacitor including a two-portion structure.
Figure 7B:
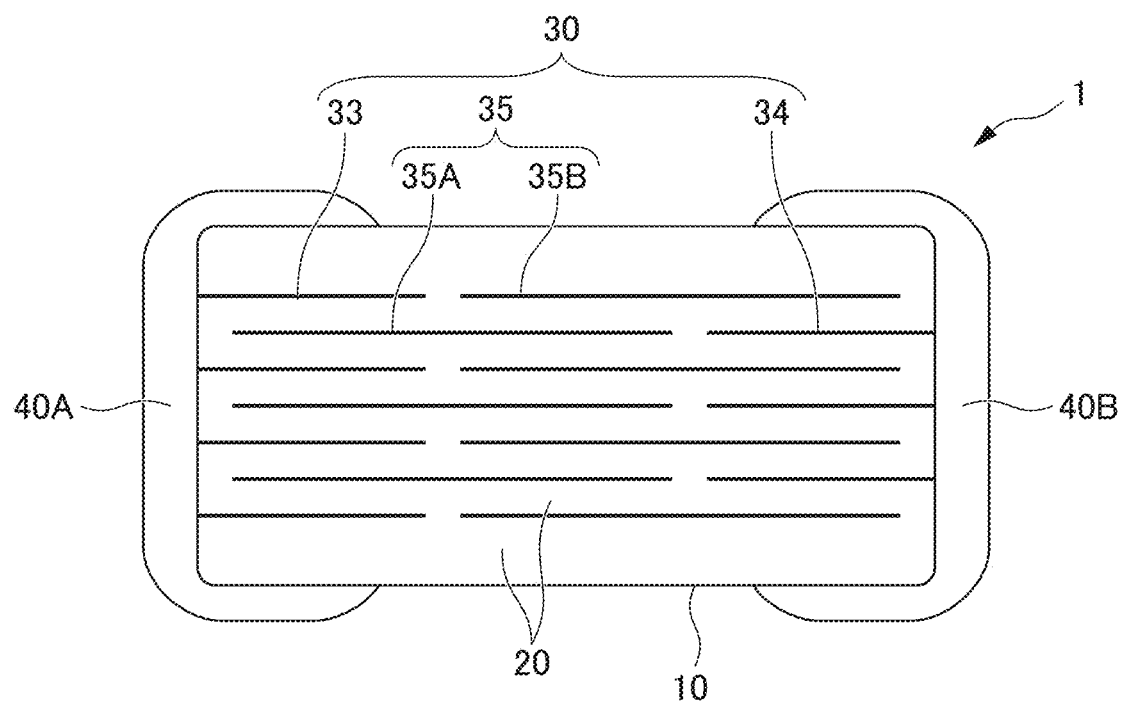
FIG. 7B is a diagram of a multilayer ceramic capacitor including a three-portion structure.

The multilayer ceramic capacitor 1 shown in FIG. 7A is a multilayer ceramic capacitor 1 including a two-portion structure. The multilayer ceramic capacitor 1 includes, as the internal electrode layer 30, a floating internal electrode layer 35 which is not exposed at either side of the first end surface LS1 and the second end surface LS2, in addition to the first internal electrode layer 33 and the second internal electrode layer 34. The multilayer ceramic capacitor 1 shown in FIG. 7B includes a three-portion structure including, as the floating internal electrode layer 35, a first floating internal electrode layer 35A and a second floating internal electrode layer 35B. The multilayer ceramic capacitor 1 shown in FIG.

7C includes a four-portion structure including, as the floating internal electrode layer 35, the first floating internal electrode layer 35A, the second floating internal electrode layer 35B and a third floating internal electrode layer 35C. Thus, by providing the floating internal electrode layer 35 as the internal electrode layer 30, the multilayer ceramic capacitor 1 includes a structure in which the counter electrode portion is divided into a plurality of counter electrode portions. With such a configuration, a plurality of capacitor components are provided between the counter internal electrode layers 30, such that a configuration in which these capacitor components are connected in series is provided. Therefore, the voltage applied to the respective capacitor components becomes low, and thus, it is possible to achieve a high breakdown voltage of the multilayer ceramic capacitor 1. It should be noted that the multilayer ceramic capacitor 1 of the present preferred embodiment may be a multiple-portion structure of four or more portions.

The multilayer ceramic capacitor 1 may be of two-terminal type including two external electrodes, or may be of multi-terminal type including a large number of external electrodes.

In the preferred embodiments of the present invention described above, the multilayer ceramic capacitor in which the dielectric layers 20 made of dielectric ceramic is used as a ceramic layer is exemplified as the multilayer ceramic electronic component. However, the multilayer ceramic electronic components of the present disclosure are not limited thereto. For example, the ceramic electronic components according to preferred embodiments of the present invention are also applicable to a piezoelectric component using piezoelectric ceramic as a ceramic layer, and various multilayer ceramic electronic components such as a thermistor using semiconductor ceramic as a ceramic layer. Examples of the piezoelectric ceramic include PZT (lead zirconate titanate) ceramic and the like. Examples of the semiconductor ceramic include spinel ceramic and the like.

The multilayer ceramic capacitor 1 according to a preferred embodiment described above achieves the following advantageous effects.

The multilayer ceramic capacitor 1 according to a preferred embodiment of the present invention includes the multilayer body 10 including the dielectric layers 20 functioning as the plurality of ceramic layers and the internal electrode layers 30 functioning as the plurality of internal conductive layers which are alternately laminated therein in the lamination direction T, the first main surface TS1 and the second main surface TS2 which are opposed to each other in the lamination direction, the first end surface LS1 and the second end surface LS2 which are opposed to each other in the length direction L perpendicular or substantially perpendicular to the lamination direction T, and the first lateral surface WS1 and the second lateral surface WS2 which are opposed to each other in the width direction W perpendicular or substantially perpendicular to the lamination direction T and the length direction L, and the pair of external electrodes 40 provided on both ends of the multilayer body 10 in the length direction L and spaced apart from each other, in which the plurality of internal conductive layers 30 include the first internal electrode layers 31 each extending toward and exposed at the first end surface LS1, and the second internal electrode layers 32 each extending toward and exposed at the second end surface LS2, in which the pair of external electrodes 40 include the first external electrode 40A including the first base electrode layer 50A connected to the first internal electrode layer 31, and the second external electrode 40B including the second base electrode layer 50B connected to the second internal electrode layer 32, in which the first base electrode layer 50A and the second base electrode layer 50B each include the metal portion 70 and the plurality of non-metal portions 80 existing in the metal portion 70, and in which, in a cross sectional view perpendicular or substantially perpendicular to the width direction W, the average area of a plurality of non-metal portions 80 in the first population of a plurality of non-metal portions 80 each having a circularity of about 0.4 or less is about 12 $\mu m^2$ or less.

This makes it difficult for the non-metal portions 80 of the first base electrode layer 50A and the second base electrode layer 50B to define and function as a path through which moisture penetrates into the inside from the outside, and as a result, the moisture resistance reliability of the multilayer ceramic capacitor 1 is increased.

In the multilayer ceramic capacitor 1 according to a preferred embodiment, it is preferable that the first base electrode layer 50A and the second base electrode layer 50B are each a fired layer.

With such a configuration, it is possible to form the first base electrode layer 50A and the second base electrode layer 50B by a relatively simple method as compared with a case of forming the first base electrode layer 50A and the second base electrode layer 50B by a thin film forming method such as a sputtering method or an evaporation method. Furthermore, by forming the fired layer simultaneously with the firing of the multilayer body 10, it is possible to simplify the manufacturing process.

In the multilayer ceramic capacitor 1 according to a preferred embodiment, it is preferable that, in a cross sectional view perpendicular or substantially perpendicular to the width direction W, a proportion of the plurality of non-metal portions 80 in the first base electrode layer 50A and the second base electrode layer 50B is about 17.2% or less.

This also makes it difficult for the non-metal portions 80 of the first base electrode layer 50A and the second base electrode layer 50B to define and function as a path through which moisture penetrates to the inside from the outside, and as a result, the moisture resistance reliability of the multilayer ceramic capacitor 1 is increased.

The present invention is not limited to the configuration of the above-described preferred embodiments, and can be appropriately modified and applied without departing from the gist of the present invention. The present invention also includes combinations of two or more of the individual desirable configurations described in the above preferred embodiments.

EXAMPLES

Examples are described below. According to the manufacturing methods described in the preferred embodiments of the present invention, multilayer ceramic capacitors of a plurality of lots manufactured so that the average area of non-metal portions in the first population in the base electrode layer became different values were manufactured as samples of Examples 1 to 6 and Comparative Examples. Examples 1 to 6 were directed to multilayer ceramic capacitors that satisfy the preferred embodiments of the present invention, and Comparative Examples were directed to multilayer ceramic capacitors that do not satisfy the preferred embodiments of the present invention. Samples of the same lot were manufactured under the same manufacturing conditions, and the specifications of the base electrode layers were the same. Seventy-two samples were prepared for each lot (Examples 1 to 6 and Comparative Examples). Next, the prepared samples were each subjected to a moisture resistance reliability test. Furthermore, the samples after the moisture resistance reliability test were polished, and parameters such as the average area of the non-metal portions in the first population were measured by the above-described measuring method.

Each sample was manufactured according to the following specifications.

Dimensions of multilayer ceramic capacitor: L×W×T=1.6 mm×0.8 mm×0.8 mm
    Dielectric layer: $BaTiO_3$
    Capacitance: 10 µF
    Rated voltage: 25 V
    Base electrode layer: electrode including an electrically conductive metal (Cu) and a glass component (thicknesses of the base electrode layers provided on the first end surface and the second end surface: 36 µm, respectively)
    Plated layer: Two layer structure of Ni plated layer (2 µm) and Sn plated layer (4 µm)
    Internal electrode layer: Ni Table 1 shows the measurement results of the average area of the non-metal portions in the first population and the proportion of the non-metal portions existing in the base electrode layer of the samples of Examples 1 to 6 and Comparative Examples. The measurement results were each an average value of 10 samples randomly extracted from among the 72 samples.

The moisture resistance reliability tests were performed under the conditions of 85° C./85% RH. The IR values (insulating resistance) before and after the test were each measured at a rated voltage, and the amount of change was confirmed. Specifically, the IR values after a charge time of 60 seconds at a rated voltage were each measured. A sample in which the IR value after the moisture resistance test was reduced by a power equal to or greater than 1 with respect to the IR value before the moisture resistance test (i.e., a sample in which the IR value was equal to or less than $\frac{1}{10}$) was determined as an "NG sample" in which the moisture resistance reliability was poor. Furthermore, a sample in which the IR value after the moisture resistance test was reduced in a range of a power equal to or greater than about 0.3 to a power less than 1 with respect to the IR value (insulating resistance) before the moisture resistance test was determined as an "IR-reduced sample" in which the IR value was reduced. The results are also shown in Table 1.

hand, as in Examples 1 to 6, when the average area of the non-metal portions existing in the first population is 12 µm² or less, the results of moisture resistance reliability are good. Therefore, the average area of the non-metal portions existing in the first population is preferably 12 µm² or less in order to secure moisture resistance reliability.

It should be noted that, in Example 1, no samples having moisture resistance reliability of NG were generated; however, samples having IR reduced in the moisture resistance reliability test were generated. Therefore, it can be evaluated that the average area of the non-metal portions existing in the first population is more preferably about 9 µm² or less.

For example, the average area of the non-metal portions of the first population is preferably about 2 µm² or more and about 12 µm² or less, and more preferably about 2 µm² or more and about 9 µm² or less. This improves moisture resistance reliability.

The proportion of non-metal portions existing in the base electrode layer is preferably about 17.2% or less. For example, the proportion of non-metal portions existing in the base electrode layer is preferably about 1.5% or more and about 17.2% or less.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
    a multilayer body including a plurality of ceramic layers and a plurality of internal conductive layers which are alternately laminated therein in a lamination direction, a first main surface and a second main surface which are opposed to each other in the lamination direction, a first end surface and a second end surface which are opposed to each other in a length direction perpendicular or substantially perpendicular to the lamination direction, and a first lateral surface and a second lateral surface which are opposed to each other in a width direction perpendicular or substantially perpendicular to the lamination direction and the length direction; and
    a pair of external electrodes on both ends of the multilayer body in the length direction and spaced apart from each other; wherein
    the plurality of internal conductive layers include:

TABLE 1

| SAMPLE | AVERAGE AREA OF NON-METAL PORTION IN FIRST POPULATION | PROPORTION OF NON-METAL PORTION IN BASE ELECTRODE LAYER | TEST RESULTS OF MOISTURE RESISTANCE RELIABILITY (NUMBER OF NG SAMPLES) | TEST RESULTS OF MOISTURE RESISTANCE RELIABILITY (NUMBER OF IR REDUCED SAMPLES) |
|---|---|---|---|---|
| Example 1 | 12.0 | 17.2% | 0/72 | 7/72 |
| Example 2 | 9.0 | 12.4% | 0/72 | 0/72 |
| Example 3 | 6.3 | 10.7% | 0/72 | 0/72 |
| Example 4 | 6.4 | 7.2% | 0/72 | 0/72 |
| Example 5 | 6.1 | 1.5% | 0/72 | 0/72 |
| Example 6 | 2.3 | 7.5% | 0/72 | 0/72 |
| Comparative Example | 14.9 | 18.1% | 7/72 | 22/72 |

As apparent in the Comparative Example from Table 1, when the average area of the non-metal portions existing in the first population exceeds 12 µm², a sample having a moisture resistance reliability of NG occurs. On the other first internal conductive layers each extending toward and exposed at the first end surface; and
    second internal conductive layers each extending toward and exposed at the second end surface;

the pair of external electrodes include:
- a first external electrode including a first base electrode layer connected to the first internal conductive layer; and
- a second external electrode including a second base electrode layer connected to the second internal conductive layer;

the first base electrode layer and the second base electrode layer each include a metal portion and a plurality of non-metal portions in the metal portion; and in a cross sectional view perpendicular or substantially perpendicular to the width direction, an average area of a plurality of non-metal portions in a first population of a plurality of non-metal portions each having a circularity of about 0.4 or less is about 12 µm² or less.

2. The multilayer ceramic electronic component according to claim 1, wherein the first base electrode layer and the second base electrode layer are each a fired layer.

3. The multilayer ceramic electronic component according to claim 2, wherein each of the fired layers includes a metal component, and at least one of a glass component or a ceramic component.

4. The multilayer ceramic electronic component according to claim 3, wherein
- the metal component includes at least one selected from Cu, Ni, Ag, Pd, Ag—Pd alloys, or Au;
- the glass component includes at least one selected from B, Si, Ba, Mg, Al, or Li; and
- the ceramic component includes at least one selected from BaTiO₃, CaTiO₃, (Ba, Ca)TiO₃, SrTiO₃, or CaZrO₃.

5. The multilayer ceramic electronic component according to claim 1, wherein, in the cross-sectional view perpendicular or substantially perpendicular to the width direction, a proportion of the plurality of non-metal portions in the first base electrode layer and the second base electrode layer is about 17.2% or less.

6. The multilayer ceramic electronic component according to claim 1, wherein the multilayer ceramic electronic component is a capacitor.

7. The multilayer ceramic electronic component according to claim 1, wherein the multilayer body has a rectangular or substantially rectangular parallelepiped shape.

8. The multilayer ceramic electronic component according to claim 1, wherein the multilayer body includes corner portions and ridge portions that are rounded.

9. The multilayer ceramic electronic component according to claim 1, wherein a dimension in the length direction of the multilayer body is about 0.2 mm or more and about 6 mm or less, a dimension of the multilayer body in the lamination direction is about 0.05 mm or more and about 5 mm or less, and a dimension of the multilayer body in the width direction is about 0.1 mm or more and about 5 mm or less.

10. The multilayer ceramic electronic component according to claim 1, wherein each of the plurality of ceramic layers includes BaTiO₃, CaTiO₃, SrTiO₃, or CaZrO₃.

11. The multilayer ceramic electronic component according to claim 10, wherein each of the plurality of ceramic layers further includes a secondary component including a Mn compound, an Fe compound, a Cr compound, a Co compound, or a Ni compound.

12. The multilayer ceramic electronic component according to claim 10, wherein a thickness of each of the dielectric layers is about 0.2 µm or more and about 10 µm or less.

13. The multilayer ceramic electronic component according to claim 1, wherein a thickness of each of the first base electrode layer and the second base electrode layer is about 10 µm or more and about 200 µm or less at the center thereof.

14. The multilayer ceramic electronic component according to claim 13, wherein a thickness of each of the first base electrode layer and the second base electrode layer is about 3 µm or more and about 40 µm or less at a portion other than the center thereof.

15. The multilayer ceramic electronic component according to claim 1, wherein each of the first base electrode layer and the second base electrode layer include an Ni plated layer and an Sn plated layer.

16. The multilayer ceramic electronic component according to claim 1, wherein the metal portion includes at least one metal component selected from Cu, Ni, Ag, Pd, an Ag—Pd alloy, or Au.

17. The multilayer ceramic electronic component according to claim 1, wherein the non-metal portions include voids or a glass component including Ba or Si.

18. The multilayer ceramic electronic component according to claim 1, wherein the average area of the plurality of non-metal portions in the first population of the plurality of non-metal portions is about 2 µm² or more and about 9 µm² or less.

19. The multilayer ceramic electronic component according to claim 1, wherein, in the cross-sectional view perpendicular or substantially perpendicular to the width direction, a proportion of the plurality of non-metal portions in the first base electrode layer and the second base electrode layer is about 5% or more and about 15% or less.

* * * * *